United States Patent
Henry et al.

(10) Patent No.: US 7,804,613 B2
(45) Date of Patent: Sep. 28, 2010

(54) METHOD AND SYSTEM FOR FACILITATING PAPER TO ELECTRONIC COMMUNICATIONS

(75) Inventors: Matthew K. Henry, San Francisco, CA (US); Christopher L. Fortescue, San Francisco, CA (US)

(73) Assignee: Mongonet, San Francisco, CA (US)

( * ) Notice: Subject to any disclaimer, the term of this patent is extended or adjusted under 35 U.S.C. 154(b) by 232 days.

(21) Appl. No.: 11/348,613

(22) Filed: Feb. 6, 2006

(65) Prior Publication Data

US 2006/0232813 A1 Oct. 19, 2006

Related U.S. Application Data

(63) Continuation of application No. 10/160,445, filed on May 28, 2002, now Pat. No. 7,079,275, which is a continuation of application No. 09/537,820, filed on Mar. 28, 2000, now Pat. No. 6,424,426.

(51) Int. Cl.
 *G06F 3/12* (2006.01)
(52) U.S. Cl. .................. 358/1.15; 358/402; 358/407; 358/440; 358/462
(58) Field of Classification Search .............. 358/1.15, 358/402, 407, 440, 462
 See application file for complete search history.

(56) References Cited

U.S. PATENT DOCUMENTS

| | | | |
|---|---|---|---|
| 4,566,127 A | 1/1986 | Sekiya et al. | |
| 4,724,309 A | 2/1988 | Greene | |
| 4,893,333 A | 1/1990 | Baran et al. | |
| 4,994,926 A | 2/1991 | Gordon et al. | |
| 5,115,326 A | 5/1992 | Burgess et al. | |
| 5,175,684 A | 12/1992 | Chong | |

(Continued)

FOREIGN PATENT DOCUMENTS

| | | |
|---|---|---|
| EP | 0465011 A | 1/1992 |
| WO | WO 96/41463 A | 12/1996 |
| WO | WO 98/53603 A | 11/1998 |
| WO | WO 99/56459 | 11/1999 |
| WO | WO 00/05654 | 2/2000 |
| WO | WO 00/78035 A | 12/2000 |

OTHER PUBLICATIONS

Emert, "Web Ad Spending Passes Outdoor Medium," San Francisco, Chronicle, May 4, 1999.

(Continued)

*Primary Examiner*—Twyler L Haskins
*Assistant Examiner*—Michael Burleson
(74) *Attorney, Agent, or Firm*—Townsend and Townsend and Crew LLP

(57) ABSTRACT

A method for a computer system includes receiving a fax from a user comprising a digitized document and a billing telephone number associated with the user, wherein the digitized document includes a digitized transmission page including a digitized recipient e-mail address, and wherein a receiving number over which the fax is received is associated with a pay-per-use service, optically recognizing characters of the recipient e-mail address from the digitized e-mail address, determining an attachment in a format suitable for attachment to an e-mail message from the digitized document, sending an e-mail message comprising an e-mail attachment portion including the attachment, an e-mail TO portion including the recipient e-mail address, and an e-mail body portion including a service provider identifier, and submitting a service charge associated with the pay-per-use service against the billing telephone number.

24 Claims, 11 Drawing Sheets

U.S. PATENT DOCUMENTS

| | | | |
|---|---|---|---|
| 5,193,110 A | 3/1993 | Jones et al. | |
| 5,227,893 A | 7/1993 | Ett | |
| 5,247,591 A | 9/1993 | Baran | |
| 5,287,199 A | 2/1994 | Zoccolillo | |
| 5,291,302 A | 3/1994 | Gordon et al. | |
| 5,339,156 A | 8/1994 | Ishii | |
| 5,386,297 A | 1/1995 | Tanaka et al. | |
| 5,404,231 A | 4/1995 | Bloomfield | |
| 5,459,584 A | 10/1995 | Gordon et al. | |
| 5,461,488 A | 10/1995 | Witek | |
| 5,465,167 A | 11/1995 | Cooper et al. | |
| 5,497,319 A | 3/1996 | Chong et al. | |
| 5,513,254 A | 4/1996 | Markowitz | |
| 5,515,176 A | 5/1996 | Galen et al. | |
| 5,555,100 A | 9/1996 | Bloomfield et al. | |
| 5,559,611 A | 9/1996 | Bloomfield et al. | |
| 5,675,507 A | 10/1997 | Bobo, II | |
| 5,767,985 A | 6/1998 | Yamamoto et al. | |
| 5,790,639 A | 8/1998 | Ranalli et al. | |
| 5,832,100 A | 11/1998 | Lawton et al. | |
| 5,841,550 A | 11/1998 | Johnson | |
| 5,848,413 A | 12/1998 | Wolff | |
| 5,870,549 A | 2/1999 | Bobo, II | |
| 5,873,077 A | 2/1999 | Kanoh et al. | |
| 5,881,233 A | 3/1999 | Toyoda et al. | |
| 5,893,908 A | 4/1999 | Cullen et al. | |
| 5,926,565 A | 7/1999 | Froessl | |
| 6,009,150 A | 12/1999 | Kamel | |
| 6,014,502 A | 1/2000 | Moraes | |
| 6,020,980 A | 2/2000 | Freeman | |
| 6,023,345 A | 2/2000 | Bloomfield | |
| 6,025,931 A * | 2/2000 | Bloomfield | 358/402 |
| 6,061,502 A | 5/2000 | Ho et al. | |
| 6,073,165 A | 6/2000 | Narasimhan et al. | |
| 6,101,244 A | 8/2000 | Okada | |
| 6,104,500 A | 8/2000 | Alam et al. | |
| 6,124,939 A | 9/2000 | Toyoda et al. | |
| 6,157,464 A | 12/2000 | Bloomfield et al. | |
| 6,157,706 A | 12/2000 | Rachelson | |
| 6,208,638 B1 | 3/2001 | Rieley et al. | |
| 6,266,160 B1 | 7/2001 | Salto et al. | |
| 6,285,777 B2 | 9/2001 | Kanevsky et al. | |
| 6,350,066 B1 | 2/2002 | Bobo, II | |
| 6,356,356 B1 * | 3/2002 | Miller et al. | 358/1.15 |
| 6,374,246 B1 | 4/2002 | Matsuo | |
| 6,424,426 B1 | 7/2002 | Henry | |
| 6,549,612 B2 | 4/2003 | Gifford et al. | |
| 6,563,914 B2 | 5/2003 | Sammon et al. | |
| 6,564,193 B1 | 5/2003 | Shore et al. | |
| 6,564,321 B2 | 5/2003 | Bobo, II | |
| 6,594,032 B1 | 7/2003 | Hiroki et al. | |
| 6,597,688 B2 | 7/2003 | Narasimhan et al. | |
| 6,600,750 B1 | 7/2003 | Joffe et al. | |
| 6,614,551 B1 | 9/2003 | Peek | |
| 6,622,174 B1 | 9/2003 | Ukita et al. | |
| 6,625,642 B1 | 9/2003 | Naylor et al. | |
| 6,643,034 B1 | 11/2003 | Gordon et al. | |
| 6,650,440 B1 | 11/2003 | Wing | |
| 6,693,729 B1 | 2/2004 | Bloomfield | |
| 6,707,580 B1 | 3/2004 | Bloomfield | |
| 6,717,938 B1 | 4/2004 | D'Angelo | |
| 6,735,021 B2 | 5/2004 | Enomoto | |
| 6,742,161 B1 | 5/2004 | James et al. | |
| 6,744,761 B1 | 6/2004 | Neumann et al. | |
| 6,772,188 B1 | 8/2004 | Cloutier | |
| 6,781,721 B2 | 8/2004 | Toyoda et al. | |
| 6,785,021 B1 | 8/2004 | Gordon et al. | |
| 6,801,546 B1 | 10/2004 | Yoshida et al. | |
| 6,826,625 B1 | 11/2004 | Fujise et al. | |
| 6,857,007 B1 | 2/2005 | Bloomfield | |
| 6,857,074 B2 | 2/2005 | Bobo, II | |
| 6,865,258 B1 | 3/2005 | Polcyn | |
| 6,914,693 B1 * | 7/2005 | Kirkeby | 358/1.15 |
| 6,999,478 B2 | 2/2006 | D'Angelo | |
| 7,020,132 B1 | 3/2006 | Narasimhan et al. | |
| 7,024,457 B1 | 4/2006 | Newman et al. | |
| 7,032,030 B1 | 4/2006 | Codignotto | |
| 7,079,275 B2 | 7/2006 | Henry | |
| 7,152,045 B2 | 12/2006 | Hoffman | |
| 7,164,488 B2 | 1/2007 | Henry | |
| 7,191,392 B1 | 3/2007 | Coar | |
| 7,202,978 B2 | 4/2007 | Gordon et al. | |
| 2001/0022669 A1 | 9/2001 | Baba | |
| 2002/0062363 A1 | 5/2002 | Naylor et al. | |
| 2003/0020959 A1 | 1/2003 | Henry | |
| 2003/0105725 A1 | 6/2003 | Hoffman | |
| 2004/0073709 A1 | 4/2004 | Bloomfield | |
| 2004/0165603 A1 | 8/2004 | D'Angelo et al. | |
| 2005/0012965 A1 | 1/2005 | Bloomfield | |
| 2005/0131944 A1 | 6/2005 | Patrick et al. | |
| 2006/0010211 A1 | 1/2006 | Patrick et al. | |
| 2006/0031310 A1 | 2/2006 | Lee | |
| 2006/0167746 A1 | 7/2006 | Zucker | |
| 2006/0167774 A1 | 7/2006 | Zucker | |
| 2006/0195540 A1 | 8/2006 | Hamilton et al. | |
| 2006/0218032 A1 | 9/2006 | Patrick et al. | |
| 2006/0232827 A1 | 10/2006 | Gordon et al. | |
| 2007/0008574 A1 | 1/2007 | Henry et al. | |
| 2007/0024899 A1 | 2/2007 | Henry | |
| 2007/0036141 A1 | 2/2007 | Zucker | |
| 2007/0168557 A1 | 7/2007 | Henry | |
| 2007/0236749 A1 | 10/2007 | Henry et al. | |

OTHER PUBLICATIONS

Ferguson, "The technology that won't die," Forbes, Apr. 5, 1999.
Lieberman, "Panasonic Machine Sends Faxes over the Internet," Computer Peripherals, Electronic Engineering Times, Nov. 10, 1997.
Net Returns, "All for One and One for All,", The Industry Standard, Aug. 16-23, 1999, p. 120.
Liebmann, Market Focus: Fax Over IP, "As long distance rates drop, IP fax vendors lose their advantage over traditional faxing. But with a bit of redefinition and value adding, the vendors are sticking around,—Rethinking IP Fax" Network Magazine, pp. 70-74.
Newsome, "Some Facts On Free Online Fax Services," Inv. Bus. Daily Jul. 2, 1999.
Norr, "The Pitch for Free Internet Fax Services," San Francisco Chronicle, Apr. 1, 1999.
Liebmann, Market Focus: Fax Over IP, "As long distance rates drop, IP fax vendors lose their advantage over traditional faxing. But with a bit of redefinition and value adding, the vendors are sticking around,—Rethinking IP Fax" Network Magazine, pp. 70-74, Jul. 1, 1999.
Office Action of Apr. 15, 2009 for U.S. Appl. No. 11/623,382, 14 pages.
Office Action of Apr. 15, 2009 for U.S. Appl. No. 11/357,759, 13 pages.
Office Action of Aug. 17, 2009 for U.S. Appl. No. 11/894,811, 8 pages.
Office Action of Dec. 28, 2009 for U.S. Appl. No. 11/694,636, 9 pages.
Office Action of Dec. 28, 2009 for U.S. Appl. No. 11/894,816, 5 pages.
Office Action of Dec. 29, 2009 for U.S. Appl. No. 11/894,811, 12 pages.
Office Action of Jan. 11, 2010 for U.S. Appl. No. 11/357,360, 6, pages.
Office Action of Jan. 11, 2010 for U.S. Appl. No. 11/357,920, 6, pages.
Office Action of Jan. 11, 2010 for U.S. Appl. No. 11/694,645, 7, pages.

* cited by examiner

Mongo Net

Send E-mail from a fax machine free service from MongoNet
* Fill in e-mail address(es) in the boxes below
* Use this page as your fax cover sheet
* Fax for free to 1(800)345-8765

Use capital (uppercase) letters. Handprint each letter, number and symbol as in the sample below:

| A | B | C | D | E | F | G | H | I | J | K | L | M | N | O | P | Q | R | S | T | U |
|---|---|---|---|---|---|---|---|---|---|---|---|---|---|---|---|---|---|---|---|---|
| V | W | X | Y | Z | 1 | 2 | 3 | 4 | 5 | 6 | 7 | 8 | 9 | 0 | @ | _ | - | . | # |   |

To: (Write e-mail address here, keep each letter in the center of the box and use dark ink)

☐☐☐☐☐☐☐☐☐☐☐☐☐☐☐☐☐☐☐☐☐—61
@☐☐☐☐☐☐☐☐☐☐☐☐☐☐☐☐☐☐☐☐—63

Cc: (optional second e-mail address)

☐☐☐☐☐☐☐☐☐☐☐☐☐☐☐☐☐☐☐☐—61
@☐☐☐☐☐☐☐☐☐☐☐☐☐☐☐☐☐☐☐☐

Cc: (optional third e-mail address)

☐☐☐☐☐☐☐☐☐☐☐☐☐☐☐☐☐☐☐☐—61
@☐☐☐☐☐☐☐☐☐☐☐☐☐☐☐☐☐☐☐☐

Freehand Notes and Drawings:

GET: Traffic and weather ☐   map ☐   movies ☐   restaurants ☐   stocks ☐   news ☐

Disclamer: blah-blah-blah. Blah blah. Blah blah. ah. Blah Blah. Blah. Blahblahblah.

Sponsor

FIG. 4.

MongoFax Confirmation Page:

Your transmission was sent to the following e-mail address(es) or fax number(s)
E-Mail: john_doe@generic.com
E-Mail: jane_doe@generic.com
Fax #: (415) 555.5555

If any of these addresses or fax numbers are incorrect,
please carefully fill out a new e-mail
address page and re-send.

_Tear along dotted line._ _ _ _ _ _ _ _ _ _ _ _ _ _ _ _ _ _ _ _ _ _ _Tear along dotted line._ _ _ _ _

Advertisement

*Dream Vacations*

Presents the chance to enter to win a free, 14 day sailing trip in the British Virgin Islands! Just fax back this request with your name and phone number indicated below, or take this coupon into a local travel agent.

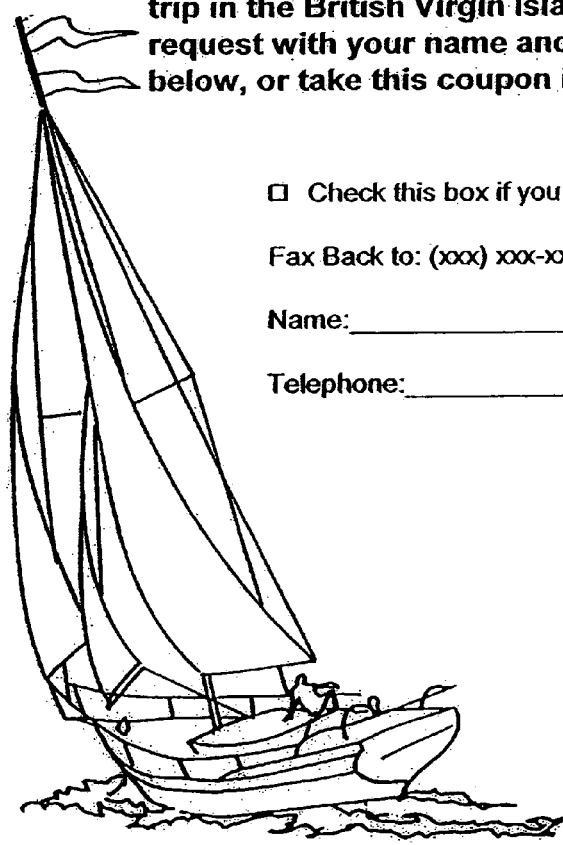

☐ Check this box if you would like to be entered to win.

Fax Back to: (xxx) xxx-xxxx

Name:_____

Telephone:_____

Your personal ID code is: 78W9ZST

*FIG.* 6A

 MongoNet

MongoFax Confirmation

Your fax was sent to the following email address:

To: SYPANG@TOWNSEND.COM

From: MATT@MONGONET.NET

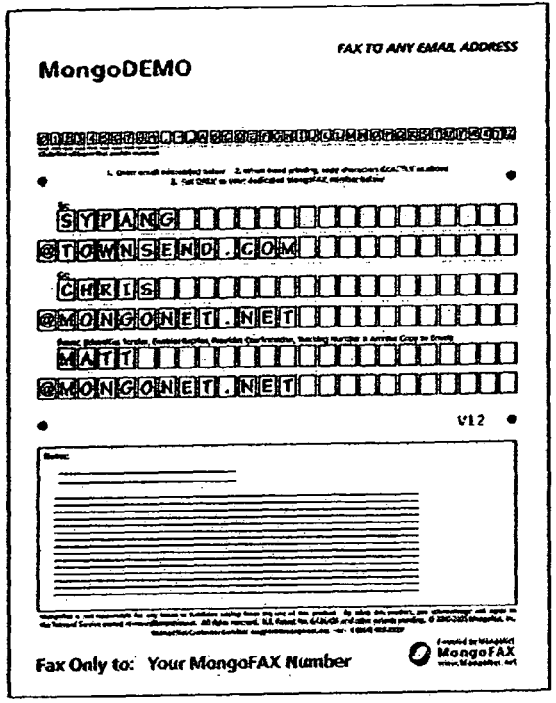

Please check above email addresses for accuracy. If any are correct, please create a new email Cover Page and try again. When hand printing, remember to write characters exactly as indicated and underline any boxes that contain number.

These are thumbnail images of the remaining pages of your 4 page fax.

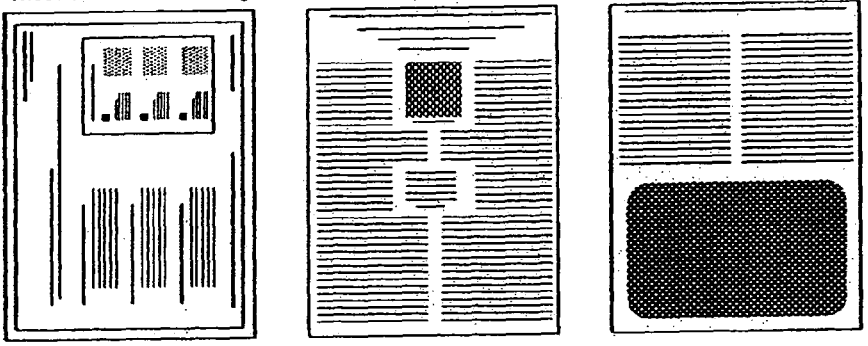

FIG. 6B

METHOD AND SYSTEM FOR FACILITATING PAPER TO ELECTRONIC COMMUNICATIONS

CROSS-REFERENCES TO RELATED APPLICATIONS

The present application is a continuation-in-part application from co-pending, commonly assigned U.S. patent application Ser. No. 10/160,445, filed on May 28, 2002, entitled "FAX-TO-EMAIL AND EMAIL-TO-FAX COMMUNICATION SYSTEM AND METHOD" by Henry, which is a continuation application of U.S. patent application Ser. No. 09/537,820 filed on Mar. 28, 2000, entitled "FAX-TO-EMAIL AND EMAIL-TO-FAX COMMUNICATION SYSTEM AND METHOD" by Henry, the disclosures of both of which are hereby incorporated by reference in their entirety for all purposes.

BACKGROUND OF THE INVENTION

The present invention relates to a facsimile (fax)/electronic mail (email) communication system. More particularly, the present invention provides for, among other things, sending and/or receiving emails, web page downloads and faxes from any standalone fax machine. A web page is a file written in hypertext markup language (HTML) and which is stored on a web server. It may also refer to images that appear as part of the page when it is displayed by a web browser.

Fax images can be moved over the Internet by converting fax signals having a fax format to an email format (e.g. RFC-822). Once the conversion is completed, the email is then transferred over the Internet to the intended destination according to the Simple Mail Transfer Protocol (SMTP) or similar protocol. The Internet is the worldwide network of networks based on the TCP/IP (Transmission Control Protocol/Protocol). Currently, there are various subscriber based service that permit a subscriber to send fax images over the Internet.

According to one type of service, offered by companies such as eFax, Jfax, CallWave and Telebot, a subscriber is provided with a unique telephone number. Any documents faxed to that number are converted to email format and transferred to the subscriber's email inbox. One drawback of this type of service is that it requires the subscriber to have a specific telephone number associated with their email address. A second drawback is that the subscriber must distribute the personal fax telephone number to any persons who would potentially want to send a fax to the subscriber. Finally, this type of service is expensive to operate from the service provider's perspective since the costs associated with buying and operating so many individual and dedicated phone numbers is very high.

Another type of service is the service offered by UUNET, which requires a subscriber to attach additional hardware between the subscriber's fax machine and the service's network. The purpose of this service is to reduce long distance faxing costs for high volume users. The UUNET system converts a fax to the equivalent of an email and then routes the email over UUNET's network to the nearest UUFAX server. The UUFAX server converts the email back to fax format and transmits the fax using a local call to the fax machine at the destination. A drawback of this type of service is that it takes time and up-front hardware additions and expenditures to have access to the service.

Hence, it would be desirable to provide a method and system that is capable of efficiently converting a facsimile to an e-mail.

SUMMARY OF THE INVENTION

Generally, the present invention comprises a facsimile/email communication system and method, whereby a user is able to send emails from any standalone facsimile machine and is also able to send facsimiles to any standalone fax machine, from either a centralized web server or a client machine connected to the Internet.

According to one aspect of the invention, a system for communicating an email from a facsimile is provided. An exemplary embodiment of this system comprises: a facsimile server configured to receive, from a start location, a facsimile in a facsimile image format, the facsimile including an email address; a character recognizer in communication with the facsimile server and configured to extract the email address; a first format converter configured to receive the facsimile and convert the facsimile to an email in an email format; an email server configured to receive the email and extracted email address and transmit the email to an end location identified by the email address; and an advertisement server configured to generate a confirmation page incorporating an advertisement on the confirmation page.

According to a second aspect of the invention, a method of communicating an email from a facsimile is provided. An exemplary embodiment of this method comprises the steps of: receiving a facsimile in a facsimile image format from a start location, the facsimile including an email address; extracting the email address from the facsimile; converting the facsimile image format to an email having an email format; and generating a confirmation page having an advertisement therein.

According to a third aspect of the invention, a system for communicating between facsimile and email is provided. An exemplary embodiment of this system comprises: a network operating center; and a plurality of geographically distributed points of presence in communication with the network operating center, each point of presence having, a facsimile server configured to receive, from a start location, a facsimile in a facsimile image format, the facsimile including an email address; a character recognizer in communication with the facsimile server and configured to extract the email address; a first format converter configured to receive the facsimile and convert the facsimile to an email in an email format; an email server configured to receive the email and extracted email address and transmit the email to an end location identified by the email address; and an advertisement server configured to generate a confirmation page incorporating an advertisement on the confirmation page.

According to a fourth aspect of the invention, a system for communicating a facsimile from an email is provided. An exemplary embodiment of this system comprises: a network operating center having a web server to which a user can log on to over the Internet to compose an email, the web server configured to capture a facsimile number contained within the email; and a plurality of geographically distributed points of presence in communication with the network operating center, each point of presence having, an email server configured to receive the email in an email format; a first format converter in communication with the email server and configured to convert it into a facsimile having a facsimile image format; an advertisement server having a return facsimile page composer and configured to generate a return facsimile page incorporating an advertisement; a second format converter configured to receive and convert the facsimile and return facsimile page to a facsimile encoded bitmap image; and a fax spooler configured to receive the facsimile encoded bitmap image and transmit it to a destination identified by the facsimile number.

According to a fifth aspect of the invention, a method of communicating a facsimile from an email is provided. An exemplary embodiment of this method comprises the steps of: logging onto a web server of a network operating center; composing an email having a facsimile number therein; capturing the facsimile number; converting the email to a facsimile; generating a return facsimile page; incorporating an advertisement in the return facsimile page; and sending the facsimile and return facsimile page to a destination identified by the facsimile number.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. Like reference numbers indicate identical or functionally similar elements.

BRIEF DESCRIPTION OF THE DRAWINGS

FIG. 4 is an exemplary illustration of an email cover page received from the POP of FIG. 2;

FIG. 6A is an exemplary illustration of a fax-to-email confirmation page received from the POP of FIG. 2;

FIG. 6B is another exemplary illustration of a fax-to-email confirmation page received from the POP of FIG. 2;

DETAILED DESCRIPTION OF THE INVENTION

Figure 1:
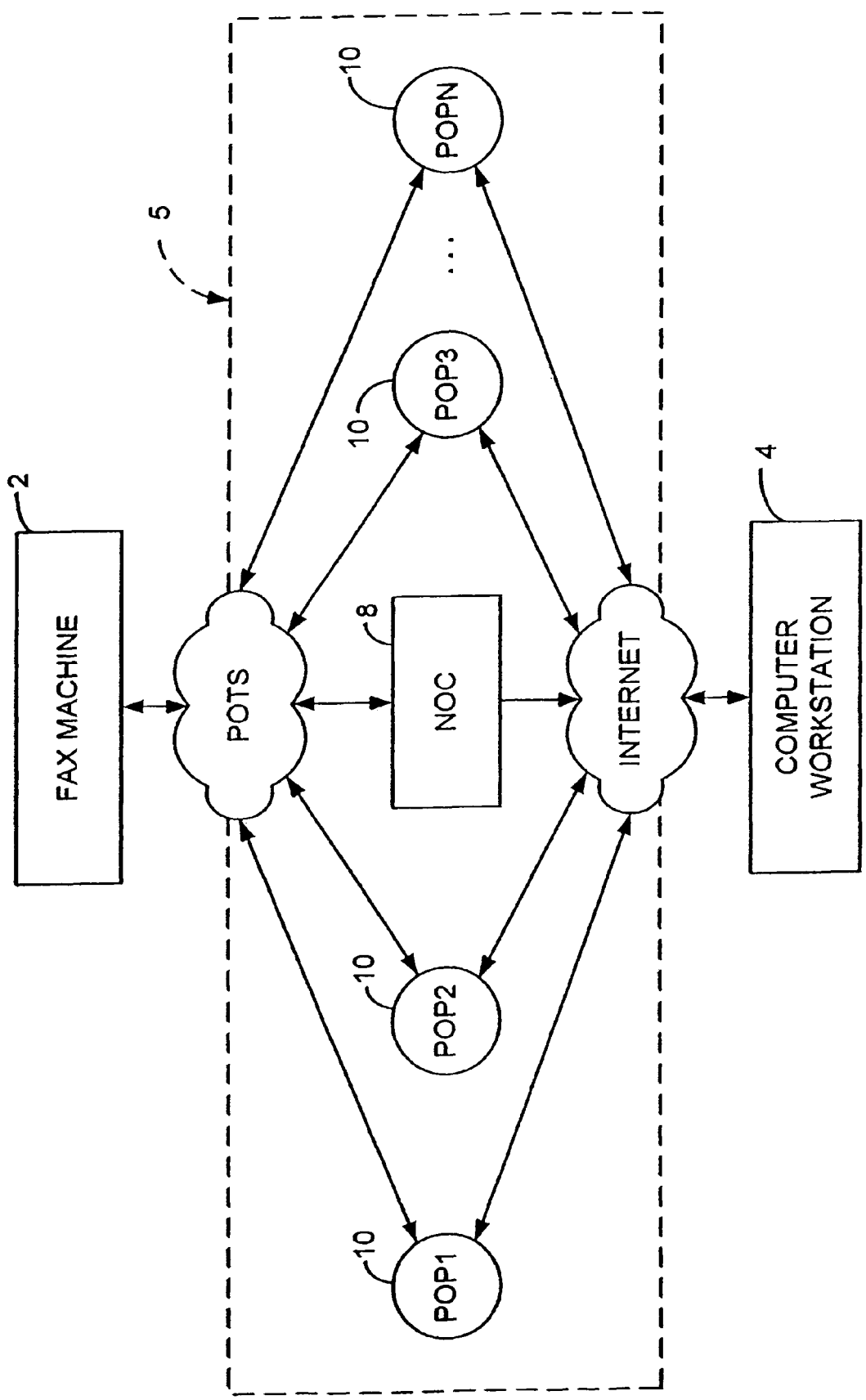
FIG. 1 is a simplified block diagram of a system according to an exemplary embodiment of the present invention.

The present invention in the form of one or more exemplary embodiments will now be described. FIG. 1 is a high-level block diagram of a facsimile/email communication system 5 according to one embodiment of the present invention. System 5 comprises a network operations center (NOC) 8, selectively coupled to both the Plain Old Telephone System (POTS) and the Internet, and a plurality of Points of Presence (POPs) 10 selectively coupled to NOC 8 via the POTs and the Internet. The "Internet," as meant here, means the worldwide network of networks based on the TCP/IP protocol and all means of access thereto (e.g. a local area network having an email system and being coupled to the Internet). (TCP/IP stands for "Transmission Control Protocol/Protocol" and is a language governing communication between all computers on the Internet.)

As will be explained in detail below, system 5 permits a user to, among other things, send an e-mail from any standalone fax machine 2 and receive faxes from a fax or email sender without having to distribute a unique and predefined fax number to the fax or email sender. Here, it should be emphasized that the fax machine 2, as shown in FIG. 1, is only a working example. In other words, fax machine as it is used in the context of the present invention may also comprise any facsimile protocol compliant communication device or any other scanning device. Similarly, computer workstation 4, in FIG. 1, is only a working example. In other words any device that is capable of sending an email may be used instead of computer workstation 4.

Figure 2:
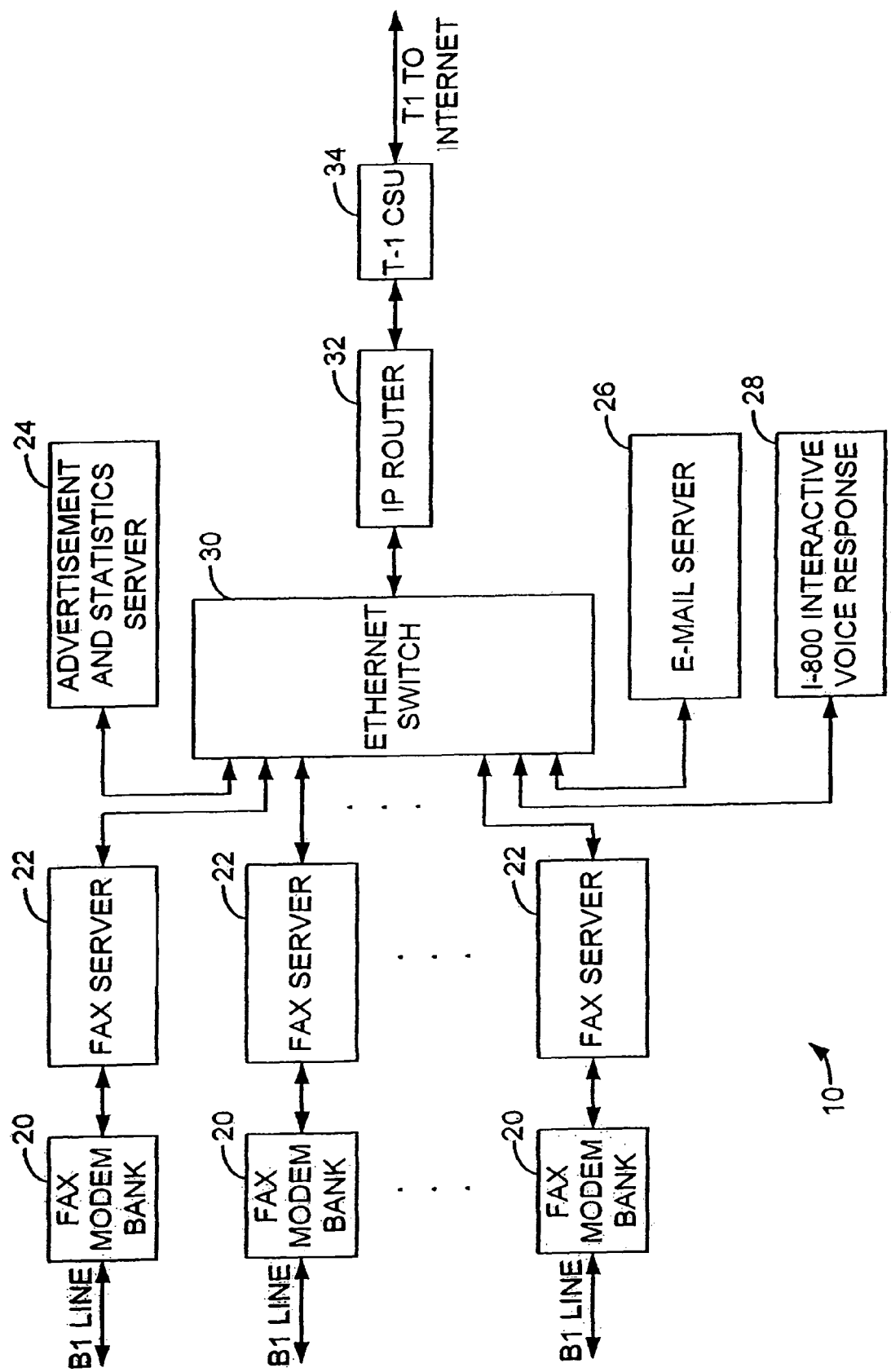
FIG. 2 is a simplified block diagram showing a hardware configuration of a Point of Presence (POP) providing a fax/email interface according to an exemplary embodiment of the present invention.

POPs 10 are distributed over a wide geographic area, for example, the United States or throughout the world. An exemplary embodiment of a POP 10 is shown in FIG. 2. POP 10 comprises one or more fax modem banks 20; one or more fax servers 22; an advertisement and statistics (ad/stat) server 24; an email server 26; an interactive voice response (IVR) unit 28; an Ethernet switch 30; an IP router 32; and a T-1 channel service unit (CSU) 34. It should be emphasized that the embodiment of POP 10 in FIG. 2 is only exemplary. For example, other configurations are within the spirit and scope of the present invention, including but not limited to use of higher-capacity Internet access lines (e.g. T-3), provision for multiple switched email servers, etc. FIGS. 1 and 2 will be described in further detail in the context of the description presented below.

Figure 3A:
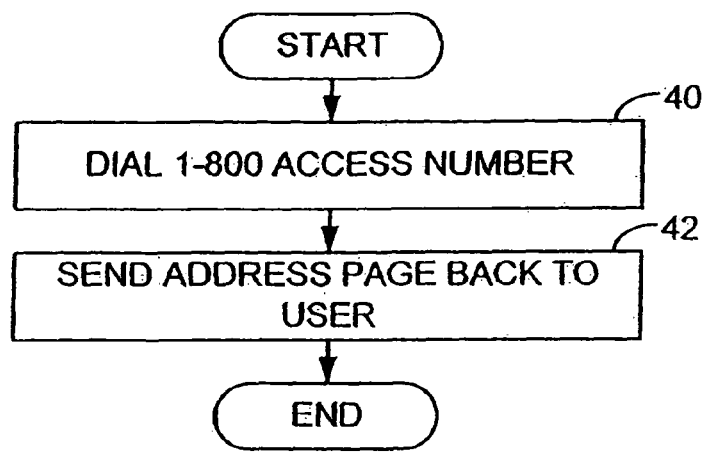
FIG. 3A is an illustration of a process of obtaining an email cover page, according to an exemplary embodiment of the present invention.

Referring now to FIG. 3A, there is shown an illustration of how a user obtains an "email cover page" from a fax server 22, according to an exemplary embodiment of the present invention. At step 40, the user dials a specific toll-free (e.g. 1-800) fax-back number from any fax machine or telephone. It should be understood that this fax-back number is not limited to a toll-free telephone number but may include any other type of telephone number as well. This fax-back number is routed by the telephone network via the POTS to a POP 10, based on the user's geographic locale. As shown in FIG. 2, fax modem bank 20 of POP 10 receives the fax over, for example, a B-1 line, which comprises 24-line telephone bundle. Then, at step 42, POP 10 sends a blank "email cover page" back to the user with further instructions on how to send an email from the user's fax machine.

The email cover page looks like a normal fax cover sheet, but it contains lines of blank character boxes and a local telephone number the user can use so that the fax can be sent without the user having to incur any cost. The local telephone number is generated by a table driven translation process through automatic number identification, detectable from outbound 1-800 numbers. In an alternative embodiment each POP 10 of system 5 would be accessible using a single toll-free number. An exemplary email cover page is shown in FIG. 4. In one embodiment the character boxes 61 have "tickmarks" 63 on the edges of each character box 61. Tickmarks 63 have the effect of coercing the user to enter characters in the character boxes 61 but away from the character box edges. Characters entered away from the character box edges is beneficial, since later in the process, when character recognition is performed, the characters can be identified more accurately.

In one exemplary embodiment, the email cover page further includes a list of special features or options that can be selected by a user. For example, one of the special features or options may be an archive option. If a user checks off this option, an archive copy of the facsimile is automatically generated and archived at a storage location. The storage location may vary depending on the design choice. For example, the storage location can be the sender's own computer system. Some other special features or options may be document format options. For instance, the document to be faxed can be sent as text only within an email, or sent as a Word attachment to an email, or sent as a PDF formatted attachment to an email. Based on the disclosure provided herein, other types of special features or options will be apparent to a person of ordinary skill in the art.

In an alternative exemplary embodiment, the email cover page can be miniaturized to the size of small adhesive note sheets, such as, Post-its. A user can still fill in the requisite information on this miniaturized email cover page. Once completed, this miniaturized email cover page can then be adhered onto the front page of a document for facsimile transmission. Subsequent character recognition can be adjusted to heighten the sensitivity needed to locate and identify the miniaturized email cover page on the front page of the document. Due to the reduced size of the miniaturized email cover page, special markings or symbols, such as a unique bar code, may be included to facilitate the character recognition that needs to be performed to allow the email addresses to be more easily located and identified within the miniaturized email cover page. Miniaturized email cover pages can be sold as peel-off pads. When a document needs to be faxed to an email address, a user simply fills in the requisite information on the miniaturized email cover page, peels off the completed miniaturized email cover page and affixes it on the front page of the document.

In another alternative exemplary embodiment, an electronic version of the email cover page in the form of an electronic file is provided to a user via e-mail or download from a website. In this exemplary embodiment, the electronic file is implemented using PDF format. When implemented in this manner, the electronic file can be activated to generate the email cover page on a computer. The email cover page is then shown to a user. The user can then directly input the desired information onto the email cover page using an input device, such as, a keyboard. Information entered in this manner is more reliable, thereby minimizing the number of errors that might occur when subsequent character recognition is performed. The completed email cover page can then be printed out and faxed with the desired document.

In addition, when an electronic email cover page is used to capture the requisite information, some of the captured information, for example, the email address, can be regenerated on another part of the email cover page. For instance, the email address may be reprinted on another part of the email cover page, or alternatively, the email address may be encoded in bar code form, or other machine-readable format, and then be printed as part of the email cover page. This provides redundancy and further enhances the accuracy of the character recognition that needs to be performed subsequently.

Optionally, certain information on the email cover page may be rendered unreadable to the recipient of the email. For example, the fax number used by the sender may be printed within a grey scale pattern or the like, such as, a moiré pattern, in which the fax number is visible to the eye of the sender before the email cover page is faxed. When faxed, however, the fax number and the pattern will not be distinguishable from each other due to the limitations of fax scanning technology thereby rendering the fax number unusable to the recipient.

Figure 3B:
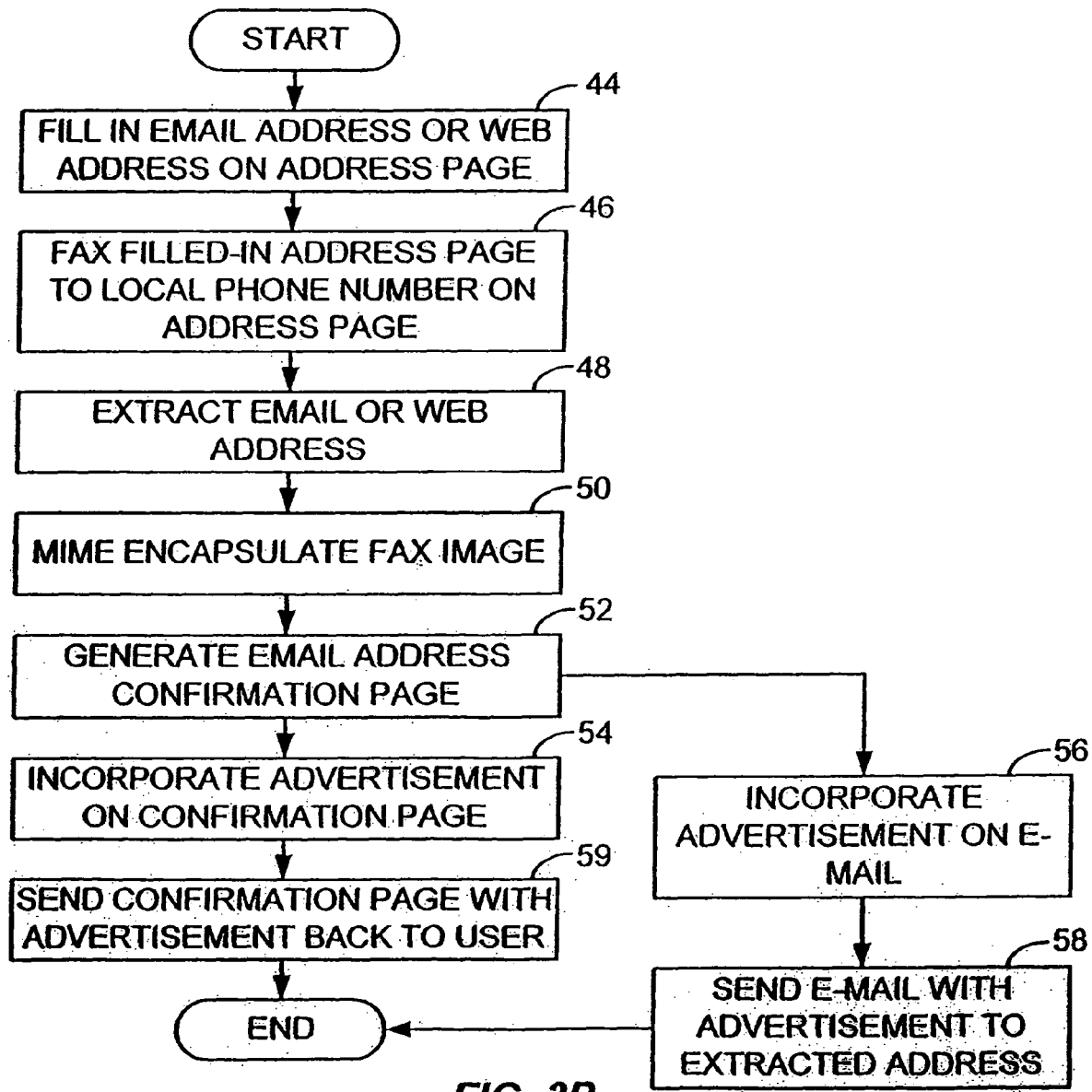
FIG. 3B is an illustration of a process of a user interacting with the system of the present invention to send an email from a fax machine, according to an exemplary embodiment of the present invention.

Referring now to FIG. 3B, there is shown an illustration of how a user interacts with the system 5 of the present invention to send an email from a fax machine, 2 according to an exemplary embodiment of the present invention. At step 44, the user fills in the letterboxes, in normal handwriting, with the final email address(es) it wishes to send to, e.g., "john_doe@generic.com". Alternatively, the email address can be printed in a machine-readable format. In an alternative exemplary embodiment, the email cover page includes an "advanced features page," which can be downloaded to the user's fax or email address. This advanced features page may also be generated at the user's computer. The advanced features page permits the user to select one or more options or services offered by the system 5 such as, for example, creating a group distribution list.

One or more group distribution lists for a particular user can be maintained by the system 5. For example, one or more group distribution lists may be associated with or linked to a particular sender email address. The email addresses within a group distribution list can be stored by the system 5. When filling out the email cover page, the user only needs to provide an alias or other identification information for a particular group distribution list. The system 5 is able to retrieve the sender email address and the alias for the particular group distribution list from the completed email cover page. The system 5 then looks up the group distribution lists associated with the sender email address and determines if the alias is associated with one of the group distribution lists linked to that sender email address. If so, the fax will be forwarded to all the email addresses in that group distribution list.

At step 46, the user sends the fax to the telephone number associated with the selected POP 10, where it is received by a fax modem bank 20 on fax server 22. Fax modem bank 20 includes an incoming fax spooler 60, which converts the fax to an image file format, which may be, for example the standard G3 TIFF format and then temporarily stores the imaged fax in a spool area on a local disk drive (not shown in the figures). The imaged email cover page is then transmitted to one of the fax servers 22 of POP 10 for further processing.

Figure 5:
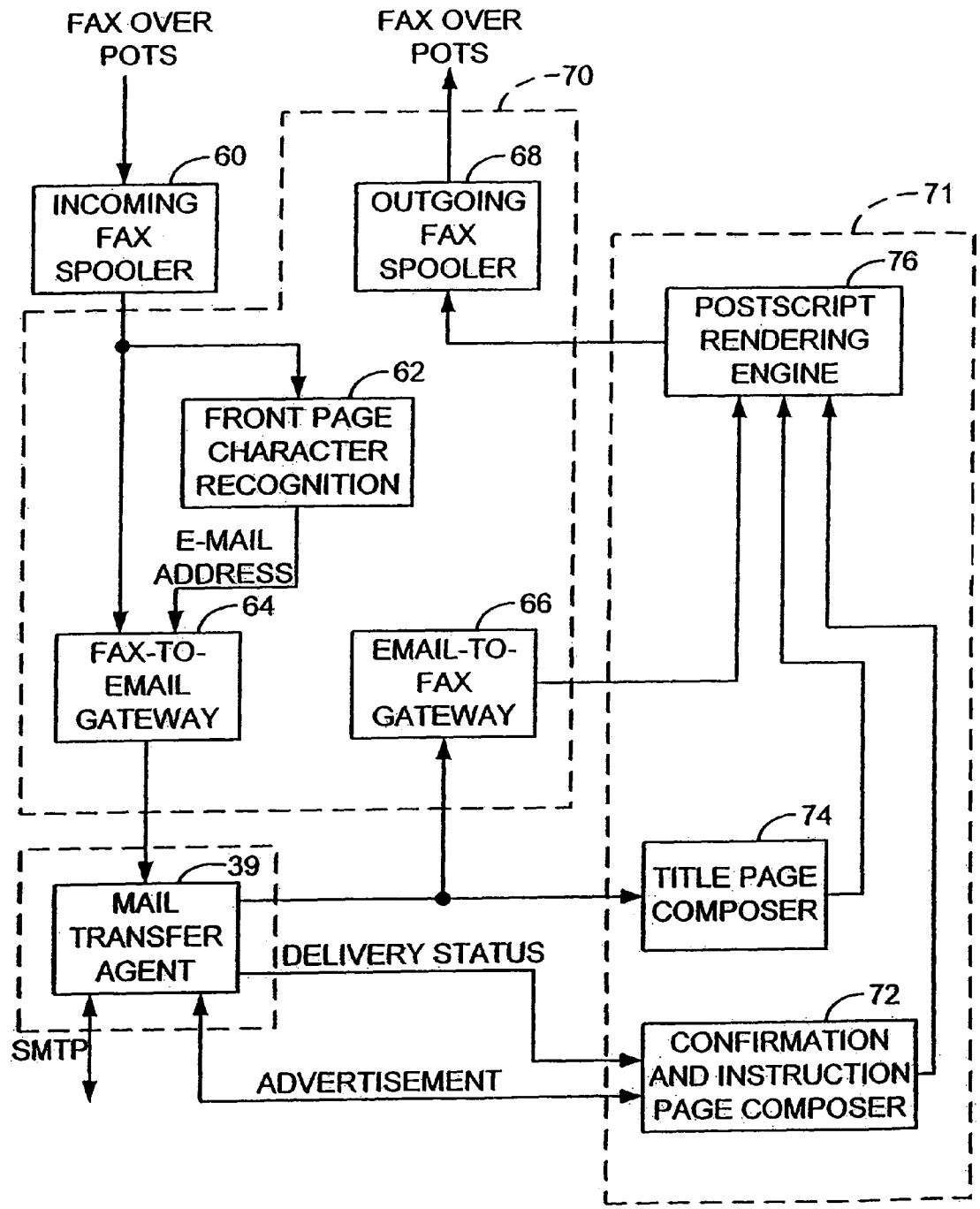
FIG. 5 is a simplified block diagram showing the software architecture of the POP of FIG. 2.

In addition to fax spooler 60, and as is shown in FIG. 5, the software architecture 70 for each fax server 22 comprises a front page (i.e. cover page) character recognition module 62, a fax-to-email gateway 64, an email-to-fax gateway 66 and an outgoing fax spooler 68.

At step 48, front page character recognition module 62 operates to extract the imaged email address from the imaged email cover page. Preferably, front page character recognition module 62 does this by optical character recognition (OCR). Optionally, the imaged email cover page may be cleansed or filtered as many times as is deemed appropriate to remove any undesired markings or patterns before the front page character recognition module 62 is invoked to perform its functions. Furthermore, as described above, the imaged email cover page may include redundant information relating to the imaged email address. The front page character recognition module 62 can be adjusted to cross-check the redundant information to ensure that the imaged email address is accurate.

At step 50, the electronic image of the fax is encapsulated and formatted into a MIME-compliant email message by fax-to-email gateway 64. "MIME" stands for Multipurpose Internet Mail Extensions and refers to an official Internet standard that specifies how email messages must be formatted so that they can be exchanged between different email systems. The electronic image of the fax is then transmitted to email server 26 as an attachment to the email. In an alternative exemplary embodiment, certain information is removed from the electronic image of the fax before it is transmitted to email server 26. For example, the specific fax number that is used by the sender may be scrubbed or otherwise rendered unreadable by the recipient of the email.

Upon receipt of the fax image by email server 26, email server 26 transmits the delivery status of the email to advertisement and statistics server (ad/stat server) 24. As shown in FIG. 5, the software architecture 71 of ad/stat server 24 comprises a confirmation and instruction page composer 72, a title page composer 74 and a PostScript rendering engine 76. Confirmation and instruction page composer 72 receives the delivery status of the email from email server 26 and subsequently generates delivery or non-delivery notifications and user instruction pages in PostScript format.

In an alternative exemplary embodiment, email server 26 and/or ad/stat server 24 may include a real-time billing engine (not shown). The real-time billing engine is used to keep track of usage by various users and generate the appropriate billing information accordingly. Usage may be tracked in a number of different ways. For example, usage may be tracked via minutes used against a specific fax number. In that regard, a user, such as a company, may be assigned one or more specific fax numbers for use by its employees. Usage against each specific fax number may be monitored by the real-time billing engine. Billing information may be calculated on a real-time basis and made available to authorized users via a website on the Internet. In addition, the billing information for each fax sent may also be included in a confirmation and instruction page as described below.

At step 52, confirmation and instruction page composer 72 generates a confirmation and instruction page, and, at step 54, retrieves advertisements from ad/stat server 24 and incorporates the advertisements into the confirmation and instruction page. Additionally, at step 56, confirmation and instruction page composer 72 retrieves advertisements from ad/stat server 24, which are incorporated, e.g. in banner format into the email. Preferably, the advertisements incorporated in the confirmation and instruction page are specifically targeted to the user's geographic locale. The system 5 determines the user's geographic locale from the user's fax number's prefix and area code and advertisements are then targeted based on demographic data characteristic of the user's neighborhood, e.g., average income bracket. In an alternative embodiment, the email address confirmation page includes an electronic commerce aspect, wherein the user is provided with a "check box" on the confirmation and instruction page, which the user can check to indicate further interest in a particular advertising offer. An exemplary embodiment of a confirmation and instruction page is shown in FIG. 6A. Optionally, the confirmation and instruction page may further include thumbnail sketches of one or more of the faxed pages, as shown in FIG. 6B.

In yet another alternative exemplary embodiment, a toll-based (e.g. 1-900) number is provided to the user at the beginning of the process, i.e., in lieu of step 10 in FIG. 3A, to provide a user with the option between the free advertising subsidized service described above or a pay-per-use service where the confirmation and instruction page does not incorporate advertisements.

In one alternative exemplary embodiment, upon receipt of the fax image by email server 26, email server 26 contacts ad/stat server 24 to retrieve preferences that may be associated with the email that is to be generated for that fax image. Preferences can be specific format, marketing information, graphics etc. and can be sender-oriented or recipient-oriented. Information from the email cover page, such as, account number, respective sender and recipient email addresses, fax number used by the sender or other unique markings or symbols, can be used to determine the preferences that are to be incorporated into the email. For example, if a fax is received from a sender using a specific fax number, the email to be generated from that fax may include information about that sender. If the specific fax number is dedicated for a particular company, certain company specific marketing information and graphics may be incorporated into the email to provide branding or standard look and feel.

In another alternative exemplary embodiment, the confirmation and instruction page may include dynamic content that is provided based on the sender's historical and/or past activities or behavior. The ad/stat server 24 may keep track of a sender's historical and/or past activities or behavior. For example, the ad/stat server 24 may keep track of the number of times faxes sent by a particular sender failed to go through because of poor handwriting or incorrect recipient email address. The ad/stat server 24 may even keep track of the type of problems that caused past failures, such as, a sender's handwriting of the letters "v" and "u" repeatedly caused faxes to fail to go through. Based on the sender's historical and/or past activities or behavior, the ad/stat server 24 then provides the appropriate information to the email server 26 to be included in the confirmation and instruction page. Such information may include, for example, tips or helpful hints to avoid problematic handwriting.

After the confirmation and instruction page has been composed, it is rasterized into a fax encoded bitmap image by PostScript rendering engine 76 and then sent to fax server 22 where outgoing fax spooler 68 operates to store the rasterized confirmation and instruction page on a local disk drive for subsequent delivery. Because bitmap image rendering is a computationally intensive process, a custom load-sharing software for distributing the rasterization process between a number of fax servers 22 machines may be employed as an alternative embodiment.

In another alternative exemplary embodiment, for promotional or marketing purposes, the email may further include a link that allows a recipient to use the services provided by the system 5 on a trial basis. The recipient/trial user may click on the link and be directed to a website. The website may show the trial user a trial offer and prompt the trial user to enter his/her email address to receive the trial offer. Assuming the trial user decides to take the trial offer and enters his/her email address, an electronic version of the email cover page is forwarded to the provided email address. This email cover page includes a specific fax number that is valid only for trial purposes. For example, this specific fax number may only be used for a limited number of fax transmissions. When the trial user uses the services provided by the system 5, the emails sent by the trial user similarly include links that allow the recipients to try the services, as described above.

At steps 58, the email (with the advertisements) is sent over the Internet to the intended recipient using, for example, SMTP protocol, and as an attachment in a standard format, e.g. GIF file, viewable on the majority of platforms.

In an alternative exemplary embodiment, a link to the email is sent over the Internet to the intended recipient. The link is created dynamically for each email. More specifically, the address for the link is randomly generated for an email on an ad hoc basis. This is done to protect against unauthorized access of the email. The intended recipient may then click on the link to retrieve and view the email.

Optionally, upon the intended recipient clicking on the link and viewing the email, a receipt is generated and forwarded to the sender to confirm that the intended recipient has received the email.

Figure 9:
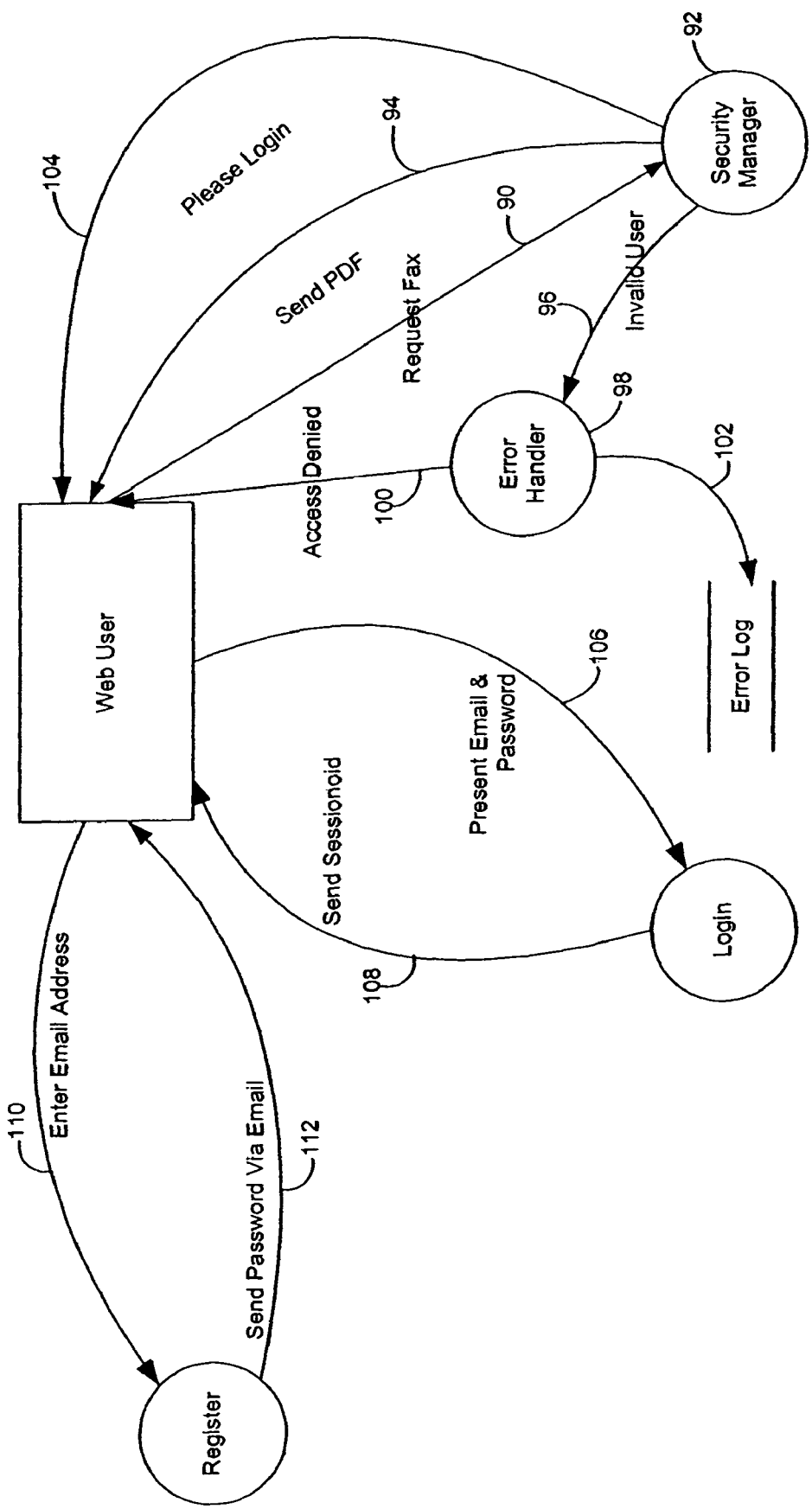
FIG. 9 is a flow diagram illustrating exemplary operations of a security mechanism used to protect against unauthorized access of emails in accordance with an exemplary embodiment of the present invention.

Optionally, when a link is used to access the email over Internet, a security mechanism is provided to allow only authorized access to the email by an intended recipient. FIG. 9 is a flow diagram illustrating exemplary operations of the security mechanism. As shown in FIG. 9, when a user receives a link, at 90, s/he clicks on the link to request access to the email or fax. By clicking on the link, the user in effect contacts a security manager 92 that controls access to the email. If the security manager 92 determines that the user is an authorized recipient, then access to the email is granted and, at 94, the security manager 92 may then send the email to the user. One way to determine that the user is an authorized recipient is for the security manager 92 to first check if the user has logged in with the security manager 92. If the user has logged in with the security manager 92, then certain credentials associated with the user is available. The credentials may include, for example, a session ID which is tied to the email address of the user. The security manager 92 then checks the email address of the user retrieved based on the credentials against the email address of the intended recipient of the email. If the two email addresses match, then the user is an authorized recipient of the requested email.

On the other hand, if the two email addresses do not match, then the user is validly logged on but is not an authorized recipient of the requested email. Then, at 96, the security manager 92 invokes an error handler routine 98. At 100, the error handler routine 98 informs the user that access to the requested email is denied because the user is not an authorized recipient. Optionally, at 102, the error handler routine 98 logs the denied request for archival and/or security purposes.

If the user is not logged in with the security manager 92, then at 104 the security manager 92 prompts the user to login. To login, at 106, the user presents his/her email address and password. The password is given at the time the user registers with the security manager 92. If the email address for the user and the provided password match those maintained by the security manager 92, at 108, the user is considered logged in and credentials such as a session ID are forwarded to the user. Once the user has the credentials, the process as described above can be repeated to determine if the user is an authorized recipient.

If the user is not a registered with the security manager 92, i.e., the user does not have a password associated with his/her email address, the user is then prompted to register with security manager 92. To register with the security manager 92, at 110, the user provides his/her email address. Upon receiving the email address, the security manager 92 generates a password that is linked to that email address and, at 112, forwards the password to the user. The security manager 92 also creates an account for the user for future reference.

Finally, at step 59, the confirmation and instruction page is sent to the user for confirmation purposes, the confirmation and instruction page possibly incorporating an advertisement as explained above. For example, the confirmation and instruction page can be sent over the POTS to the user in the form of a confirmation fax if a fax number for the sender is available; similarly, the confirmation and instruction page can also be sent to the user in the form of a confirmation email or as a part thereof.

In an alternative exemplary embodiment, the confirmation and instruction page may also be sent to other e-mail addresses. For example, if the fax that is sent relates to company business, a confirmation copy of the email generated from that fax may be forwarded to the company's archive or storage facility for storage or archive purposes.

At this point, it should be emphasized that, whereas the software modules of the software architecture of FIG. 5 are shown to be distributed over multiple servers, one skilled in the art would understand that all the software modules could reside on a single server or on different servers than is shown in the embodiment of FIG. 5.

In an alternative exemplary embodiment, a user can interact with the system of the present invention to send a facsimile from any standalone facsimile machine to any other standalone facsimile machine. To do this, the user procures a "facsimile number page," as for example, similar to procuring the "email cover page" described above in relation to steps 40 and 42. The user then enters a facsimile number of the intended facsimile recipient, for example, in handwritten format or printed machine readable format, and then faxes the facsimile to the local number of the selected POP 10 as in steps 44 and 46 described above (or, alternative, enters a pay-per-use toll-based number as is also described above). Upon receipt of the facsimile by the selected POP 10, the facsimile number is then extracted and the electronic image of the facsimile is formatted into a MIME-compliant email message by fax-to-email gateway 64, similar to steps 48 and 50 above. Next, email server 26 transmits the MIME image to an email-to-fax gateway 66, which could reside on a different POP 10, where the email-to-fax gateway 66 converts the MIME image into a text-formatted (e.g. PostScript) file. Then, PostScript rendering engine 96 operates to rasterize the text-formatted file into a fax encoded bit map image. And, finally, outgoing fax spooler 68 receives the fax encoded bit map image and transmits it to the intended facsimile recipient.

In yet another exemplary embodiment of the present invention, webpages can be downloaded via fax. In this embodiment, a user is provided with an "email cover page" as described above. This email cover page provides letterboxes for entering the desired web address (which, for example can be entered in normal handwriting or printed in a machine readable format) and an indicator of some sort, which the user can use to request the number of pages from the web address the user wishes to download. One type of indicator on the cover page, for example, could be a series of bubbles positioned at predetermined positions on the cover page.

Figure 7:
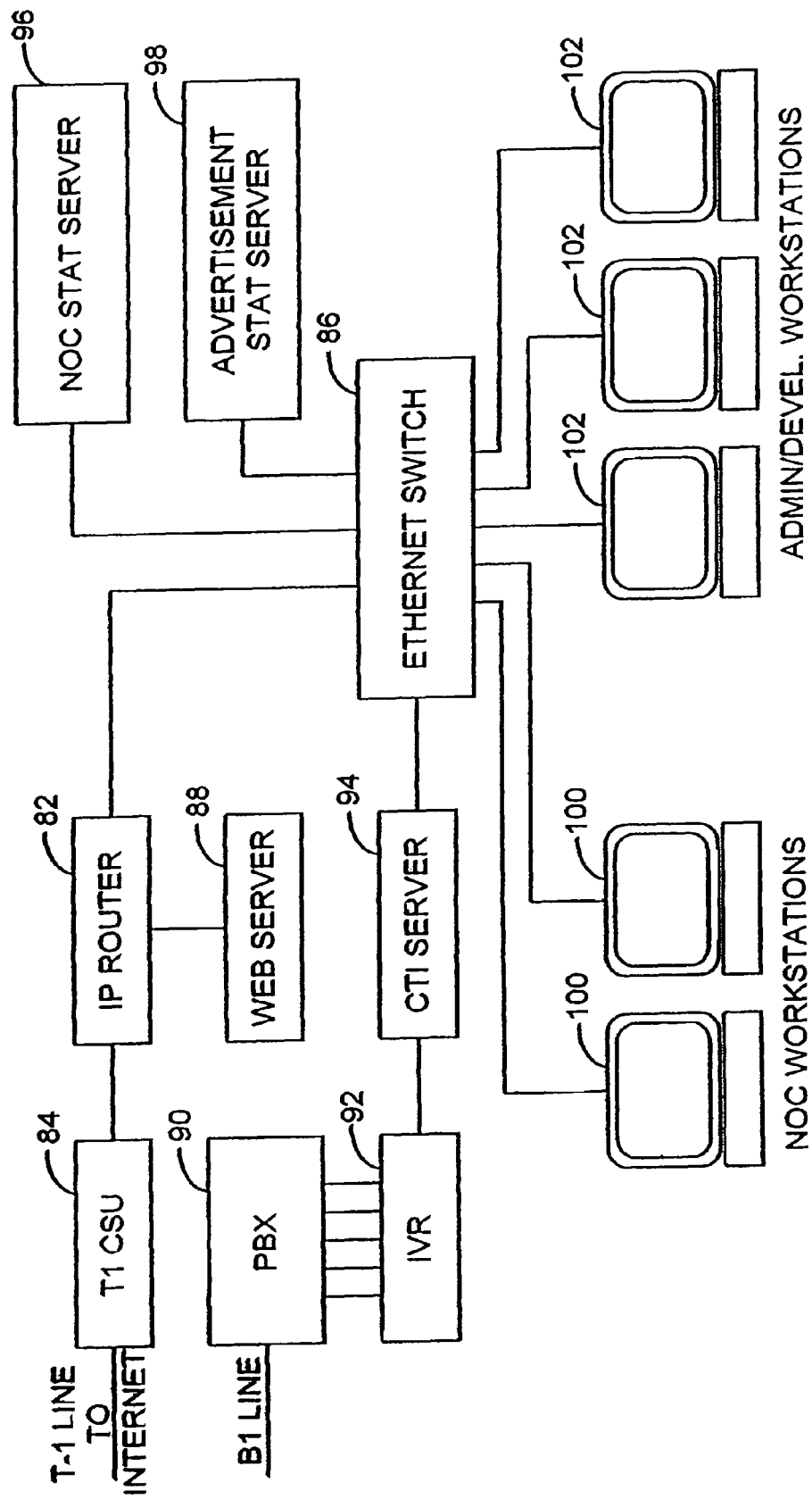
FIG. 7 is a simplified block diagram of a network operations center (NOC)

Referring now to FIG. 7, there is shown a network operations center (NOC) 8, according to an exemplary embodiment of the present invention. NOC 8 functions as the system headquarters and is configured to communicate with all POPs 10, as was shown and described in reference to FIG. 1. NOC 8 comprises an Internet access router and firewall component (IP router) 82 coupled between the Internet via, for example, a T1 channel service unit (CSU) 84 and an Ethernet switch 86 (at a data rate of, for example, 100 Mbps); a web server 88 coupled to IP router 82; a private branch exchange (PBX) 90 coupled to the telephone network via, for example, a B-1 line; an interactive voice response (IVR) unit 92 coupled to PBX 90 and a computer-telephony integrated (CTI) server 94 coupled between IVR unit 92 and Ethernet switch 86. Also coupled to Ethernet switch 86 is an NOC statistics server 96; an NOC advertisement statistics server 98; NOC workstations 100; and administrative/development workstations 102.

NOC advertisement statistics server 98 stores, and makes available to advertisers, statistics relating to the advertiser's advertisement(s), for example, the number of times the advertisement was sent, the number of positive responses from viewers of the advertisement, etc.

NOC administrative/development workstations function as a help desk to those users who log on to web server 88 and also allow the system provider to do development, for example, improving the functionality of the web site provided by web server 88.

IVR unit 92 permits a user to dial into the NOC via PBX 90 using the same 1-800 toll free access number used in the initiation of a fax-to-email process described above. IVR 92 provides user's with voice prompts, which the user can respond to using the telephone keypad. The prompts may relate to, for example, use instructions or may permit a user to download information from the Internet, e.g. stock quotes, weather predictions, travel information, etc.

Figure 8A:
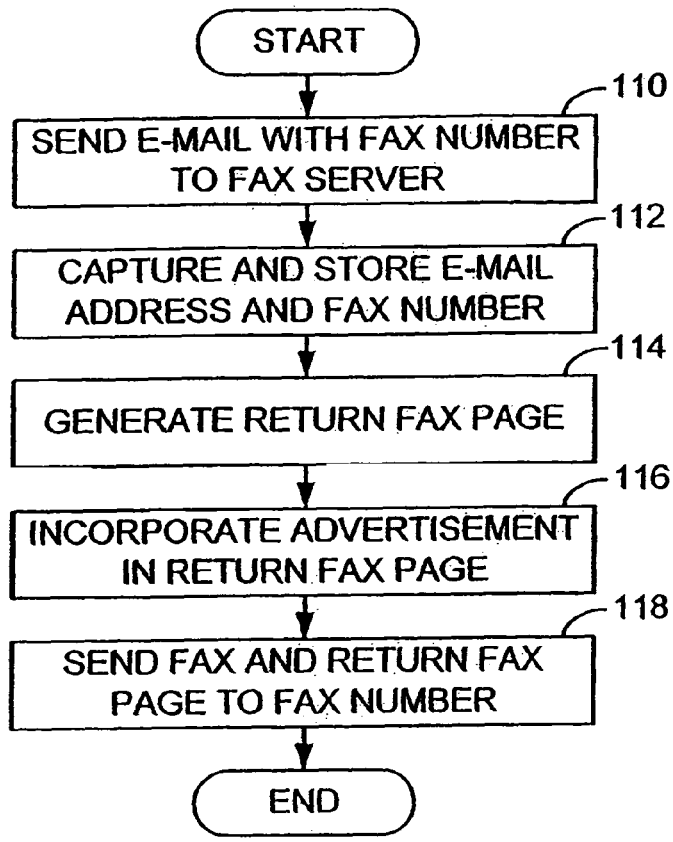
FIG. 8A is an illustration of a process of a user interacting with the system of the present invention to send a fax from an email, according to an exemplary embodiment of the present invention.

In another embodiment of the present invention, a user can logon to web server 88 from, for example, a computer workstation 4 (See FIG. 1), and then send a fax from an email to any standalone fax machine. An exemplary process for accomplishing this is shown in FIG. 8A.

At step 110, after the user logs on to web server 88 (See FIG. 7), the user sends an email to web server 88. Then, at step 1112, web server 88 captures and stores the user's email address and the fax number to which the user wishes to send the fax. This information is relayed over the Internet to email server 26 of the, preferably, nearest POP 10, to which the fax number is associated. As shown in FIG. 5, each email server 26 contains a mail transfer agent 39, which accepts the email from NOC 8. Email-to-fax gateway 66 then operates to convert the email message into PostScript text.

At step 114 title page composer 74 generates a return fax page, and, at step 116 retrieves advertisements from ad/stat server 24 and incorporates the advertisements into the return fax page. Preferably, the advertisements are specifically targeted to the fax recipient's location. The system 5 determines this from the recipient's fax number's prefix and area code by comparing the numbers to area code and prefix numbers stored in ad/stat server 24. Once the neighborhood is identified, advertisements are then targeted based on demographic data characteristic of the recipient's neighborhood, e.g., average income bracket. In an alternative embodiment, the return fax page includes an electronic commerce aspect, wherein the fax recipient is provided with a "check box" on the return fax page, which the recipient can check to indicate further interest in a particular advertising offer.

After the return fax page has been composed, it and the converted fax image are rasterized into a fax encoded bitmap image by PostScript rendering engine 76 and then sent to a fax modem bank 20 of POP 10 where outgoing fax spooler 68 operates to store the rasterized fax and return fax page on a local disk drive for subsequent delivery.

At step 118, the fax and return fax page are sent over the POTS to the fax recipient.

Figure 8B:
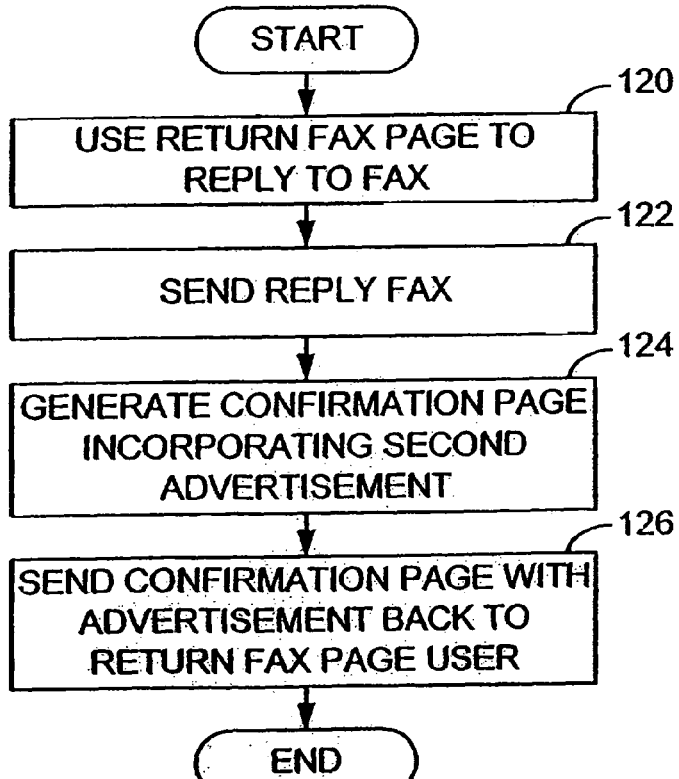
FIG. 8B is an illustration of a reply process wherein a recipient of the fax, delivered in the process according to FIG. 8A, replies to the fax using a return fax page.

Referring now to FIG. 8B, at step 120, upon receipt of the fax and return fax page, the fax recipient uses the return fax page to reply to the fax and sends the reply fax at step 122.

At step 124, title page composer 74 of ad/stat server 24 operates to generate a confirmation page incorporating a second advertisement, which is then, at step 126, sent back to the return fax page user. Steps 124 and 126 substantially follow the steps 54 and 59 as described in reference to the fax-to-email process of FIG. 3B.

The advertising subsidized aspect of the system and method of the present invention also allows a user to send a fax from any standalone fax machine to any other standalone fax machine for free, thereby avoiding long distance telephone charges, which are typically billed for any long-distance fax transmission. To accomplish this, a user simply dials the toll free (1-800) access number, as explained above, to obtain a local number to a POP 10. Local POP 10 then responds by faxing back a cover page to the user. Steps 44 through 48 are then performed, as was described in relation to FIG. 3B, followed by steps 110 through 118 as was described previously in relation to FIG. 8A. The only difference from the process as described above would be to provide letterboxes for fax addresses on the cover page and provide for OCR capability for extracting fax addresses.

In another alternative embodiment of the present invention, NOC 8 includes a local database (not shown in FIG. 7), which is configured to store a frequent user's email address book. The user can logon to web server 88, upload the address book and associate nicknames or real names with each email address (e.g. "John Doe" for john_doe@generic.com). By doing this, the user can then send emails from any standalone fax machine simply by filling in the letterboxes of the email cover page (as described previously with respect to FIG. 3B) with the nickname or real name of the intended recipient. Finally, in another exemplary embodiment of the present invention, advertisers are provided with a "dynamic print advertising" service, whereby an advertiser can logon to web server 88 of NOC 8, open an account, create advertisements and customize them based on specific demographic information.

Figure 10:
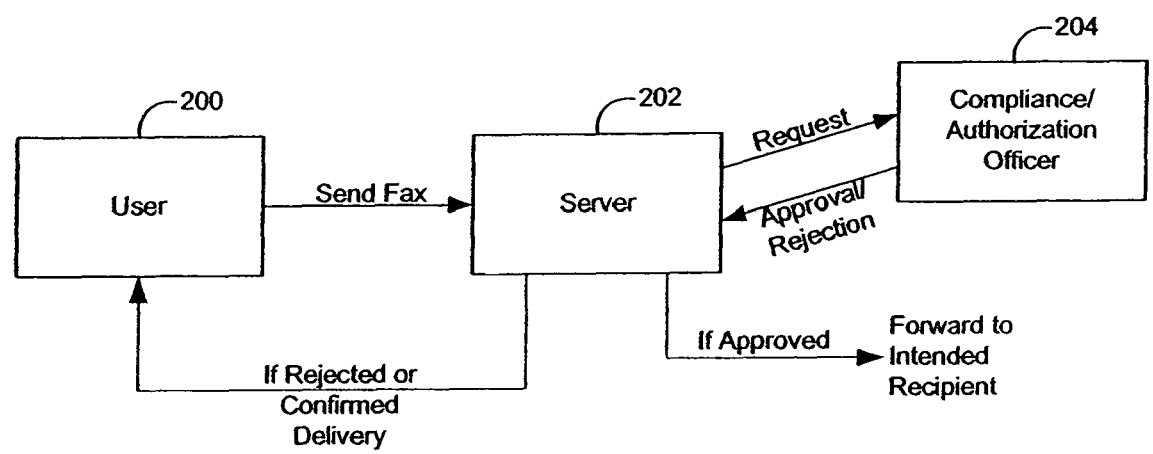
FIG. 10 is a simplified block diagram illustrating an exemplary application in accordance with the present invention.

The present invention as described above can be deployed in many different applications. FIG. 10 is a simplified block diagram illustrating an exemplary application in accordance with the present invention. As shown in FIG. 10, a user 200 faxes a document using the system 5 as described above. The faxed document is received by a server 202 and put in a processing queue to await processing. When the faxed document is processed, an email generated based on the faxed document is forwarded to a compliance/authorization officer 204. The email may be delivered to the compliance/authorization officer 204 using a number of different methods; but preferably, the email is delivered through a secure website or a virtual private network. In this particular application, the compliance/authorization officer 204 reviews the email to determine if it is allowed to be sent to its intended recipient. After the email has been reviewed, the compliance/authorization officer 204 relays its approval/rejection back to the server 202 for further actions. If an approval is given, then the server 202 forwards the email to the intended recipient. Optionally, a confirmation for delivery may be forwarded to the user 200. On the other hand, if a rejection is given, then the server 202 prevents the email from being sent to the intended recipient and informs the user 200 of the actions taken. Based on the disclosure provided herein, a person of ordinary skill in the art will know of other ways and/or manners to apply the present invention.

In an alternative exemplary embodiment, the system 5 is capable of handling inputs having different types of electronic formats. For example, instead of a user sending a document via a fax machine, the user may choose to first use a scanner to scan the document into a scanned image. The scanned image of the document is then forwarded to the fax server 22. Depending on the scanning technology used to produce the scanned image, the fax server 22 accordingly converts the scanned image for processing as described above. Based on the disclosure and teachings provided herein, a person of ordinary skill in the art will be able to implement the present invention to handle inputs with different types of electronic formats.

In summary, the method and apparatus of the present invention permits a user to, among other things, send an e-mail from any standalone fax machine; receive a fax from another without requiring the user to have previously procured and distributed a unique and predefined (i.e., one-to-one fax number to email relationship) fax number; and send a fax from an email by logging onto a web server provided by a centralized operating center.

Although the invention has been described in terms of preferred methods and structure, it will be obvious to those skilled in the art that many modifications and alterations may be made to the disclosed embodiments without departing from the invention. Hence, these modifications and alterations are intended to be considered as within the spirit and scope of the invention as defined by the appended claims.

What is claimed is:

1. A computer system providing fax to e-mail messaging operated by a fax-to-e-mail service provider comprises:
    a receiving portion configured to receive a facsimile transmission comprising a digitized representation of a document from a user using a facsimile transmission device and comprising a billing telephone number associated with the facsimile transmission device, wherein the digitized representation of the document includes a digitized representation of a user-modified transmission page, wherein the digitized representation of the user-modified transmission page includes a digitized representation of an e-mail address for a recipient, and wherein a receiving telephone number over which the facsimile transmission is configured to be received is associated with a pay-per-use service;
    an optical character recognition portion configured to determine the e-mail address for the recipient in response to the digitized representation of the e-mail address for the recipient;
    a formatting portion configured to determine an attachment in response to the digitized representation of the document, wherein the attachment is in a format suitable for attachment to an e-mail message; and
    a sending portion configured to send an e-mail message comprising an e-mail attachment portion, an e-mail TO portion, and an e-mail body portion, wherein the e-mail attachment portion comprises the attachment, wherein the e-mail TO portion comprises the e-mail address for the recipient, and wherein the e-mail body portion comprises an indication of a service provider, and
    wherein a service charge associated with the pay-per-use service may be charged to the user via a telephone bill provided by a telephone-service service provider associated with the billing telephone number, wherein the telephone-service provider is distinct from the fax-to-e-mail service provider.

2. The computer system of claim 1 further comprising a transmission page storage portion configured to store a copy of a pre-user-modified transmission page which may be provided to the user, wherein the user modifies the pre-user-modified transmission page to form the user-modified transmission page.

3. The computer system of claim 2 wherein the pre-user-modified transmission page comprises a printed representation of the receiving telephone number.

4. The computer system of claim 2 wherein the pre-user-modified transmission page storage portion comprises a server configured to provide the pre-user-modified transmission page to the user.

5. The computer system of claim 1 wherein the user-modified transmission page comprises a printed representation of the e-mail address for the recipient at a predetermined location of the user-modified transmission page.

6. The computer system of claim 5
    wherein the user-modified transmission page comprises a printed representation of a plurality of character regions; and
    wherein printed representations of characters of the e-mail address for the recipient are located in individual character regions from the plurality of character regions.

7. The computer system of claim 6 wherein the printed representations of the characters of the e-mail address for the recipient are formatted in a manner selected from a group consisting of: handwritten format or printed machine readable format.

8. The computer system of claim 1 wherein the format suitable for attachment to an e-mail message comprises a multi-platform format.

9. A method for a computer system including a processor and a memory for providing fax to e-mail messaging operated by a fax-to-e-mail service provider comprises:
    storing a facsimile transmission comprising a digitized representation of a document from a user using a facsimile transmission device and a billing telephone number associated with the facsimile transmission device in the memory, wherein the digitized representation of the document includes a digitized representation of a user-modified transmission page, wherein the digitized representation of the user-modified transmission page includes a digitized representation of an e-mail address for a recipient, and wherein a receiving telephone number over which the facsimile transmission is configured to be received is associated with a pay-per-use service;
    performing optical character recognition to determine the e-mail address for the recipient under direction of the processor in response to the digitized representation of the e-mail address for the recipient;
    determining an attachment in response to the digitized representation of the document under direction of the processor, wherein the attachment is in a format suitable for attachment to an e-mail message;
    sending an e-mail message comprising an e-mail attachment portion, an e-mail TO portion, and an e-mail body portion under direction of the processor, wherein the e-mail attachment portion comprises the attachment, wherein the e-mail TO portion comprises the e-mail address for the recipient, and wherein the e-mail body portion comprises an indication of a service provider, and
    submitting a service charge associated with the pay-per-use service to the user via a telephone bill provided by a telephone-service service-provider associated with the billing telephone number under direction of the processor, wherein the telephone-service provider is distinct from the fax-to-e-mail service provider.

10. The method of claim 9 further comprising providing a copy of a pre-user-modified transmission page to the user, wherein the user modifies the pre-user modified transmission page to form the user-modified transmission page.

11. The method of claim 10 wherein the pre-user-modified transmission page comprises a printed representation the receiving telephone number.

12. The method of claim 10 wherein providing the copy of the pre-user-modified transmission page to the user is selected from a group consisting of: providing an e-mail message including the copy of the pre-user-modified transmission page to the user, providing a web site including a link to the copy of the pre-user-modified transmission page to the user.

13. The method of claim 9 wherein the user-modified transmission page comprises at least one printed representation of the e-mail address for the recipient at least one predetermined location on the user-modified transmission page.

14. The method of claim 13
wherein the user-modified transmission page comprises a printed representation of a plurality of character regions; and
wherein printed representations of characters of the e-mail address for the recipient are located in individual character regions from the plurality of character regions.

15. The method of claim 14 wherein the printed representations of the characters of the e-mail address for the recipient are formatted in a manner selected from a group consisting of: handwritten format or printed machine readable format.

16. The method of claim 9 wherein the format suitable for attachment to an e-mail message comprises a multi-platform format.

17. A method for providing fax to e-mail messaging comprises:
receiving a pre-user-modified facsimile transmission page from a facsimile server operated by a fax-to-e-mail service provider;
creating a user-modified facsimile transmission page by a user providing an e-mail address of a recipient on the pre-user-modified facsimile transmission page to form a user-modified facsimile transmission page;
dialing a receiving telephone number associated with a facsimile server from a facsimile transmission device associated with a billing telephone number, wherein the receiving telephone number is associated with a pay-per-use service;
sending a facsimile transmission via the facsimile transmission device to the facsimile server, wherein the facsimile transmission includes a digitized representation of a document comprising a digitized representation of the user-modified facsimile transmission page including a digitized representation of the e-mail address of the recipient;
wherein an e-mail message is sent to the e-mail address of the recipient and includes an e-mail attachment determined in response to the digitized representation of the document;
wherein characters of the e-mail address for the recipient are recognized optically in response to the digitized representation of the e-mail address for the recipient;
wherein the e-mail attachment is in a format suitable for attachment to the e-mail message;
wherein and a body of the e-mail message comprises an indication of the fax-to-e-mail service provider, and
wherein a service charge associated with the pay-per-use service is charged to the user via a telephone bill provided by a telephone-service service-provider associated with the billing telephone number, wherein the telephone-service provider is distinct from the fax-to-e-mail service provider.

18. The method of claim 17 wherein the pre-user-modified facsimile transmission page comprises a printed representation the receiving telephone number.

19. The method of claim 18 wherein receiving the pre-user-modified facsimile transmission page is selected from a group consisting of: receiving an e-mail message including the copy of the pre-user-modified facsimile transmission page, downloading the pre-user-modified facsimile transmission page from a web site.

20. The method of claim 17 wherein the user-modified facsimile transmission page comprises a printed representation of the e-mail address for the recipient at a predetermined location on the user-modified facsimile transmission page.

21. The method of claim 20
wherein the user-modified facsimile transmission page comprises a printed representation of a plurality of character regions; and
wherein entering the e-mail address of the recipient comprises providing representations of characters of the e-mail address for the recipient in individual character regions from the plurality of character regions.

22. The method of claim 21 wherein providing representations of characters of the e-mail address for the recipient comprises providing representations of characters in a manner selected from a group consisting of: handwritten representation, printed machine readable representation.

23. The method of claim 17 wherein receiving the pre-user-modified facsimile transmission page comprises:
receiving an electronic representation of the pre-user-modified facsimile transmission page; and
printing-out the pre-user-modified facsimile transmission page on a printer.

24. The method of claim 17 further comprising:
receiving a confirmation that the e-mail message was sent to the e-mail address of the recipient, wherein the confirmation comprises a facsimile confirmation.

* * * * *

UNITED STATES PATENT AND TRADEMARK OFFICE
CERTIFICATE OF CORRECTION

PATENT NO.        : 7,804,613 B2
APPLICATION NO.   : 11/348613
DATED             : September 28, 2010
INVENTOR(S)       : Matthew K. Henry and Christopher L. Fortescue Page 1 of 1

It is certified that error appears in the above-identified patent and that said Letters Patent is hereby corrected as shown below:

In Claim 13:
At column 15, line 6, "recipient at least" should be changed to -- recipient at at least --

Signed and Sealed this
Twenty-sixth Day of April, 2011

David J. Kappos
*Director of the United States Patent and Trademark Office*